United States Patent
Allinson et al.

(10) Patent No.: US 11,146,527 B2
(45) Date of Patent: Oct. 12, 2021

(54) MAPPING NETWORK MAC ADDRESSES TO PHYSICAL LOCATIONS

(71) Applicant: Oath Inc., New York, NY (US)

(72) Inventors: Richard Stephen Allinson, Morgan Hill, CA (US); David Alan Glass, Marion, IL (US); Philip Jacob Halley, Sunnyvale, CA (US); Matthew Llewellyn Lemare Jones, San Francisco, CA (US)

(73) Assignee: VERIZON MEDIA INC., New York, NY (US)

( * ) Notice: Subject to any disclaimer, the term of this patent is extended or adjusted under 35 U.S.C. 154(b) by 47 days.

(21) Appl. No.: 16/236,169

(22) Filed: Dec. 28, 2018

(65) Prior Publication Data

US 2020/0213263 A1 Jul. 2, 2020

(51) Int. Cl.
*H04L 29/12* (2006.01)
*H04L 29/08* (2006.01)

(52) U.S. Cl.
CPC .......... *H04L 61/10* (2013.01); *H04L 61/6022* (2013.01); *H04L 67/18* (2013.01)

(58) Field of Classification Search
CPC ...... H04L 61/10; H04L 61/6022; H04L 67/18
USPC ....................................................... 709/245
See application file for complete search history.

(56) References Cited

U.S. PATENT DOCUMENTS

| 6,661,372 | B1 * | 12/2003 | Girerd | G01S 19/09 342/357.75 |
| 2004/0083293 | A1 * | 4/2004 | Chen | H04L 29/12839 709/227 |
| 2004/0141468 | A1 * | 7/2004 | Christensen | H04L 12/2898 370/252 |
| 2005/0252957 | A1 * | 11/2005 | Howarth | G01S 13/825 235/375 |

(Continued)

FOREIGN PATENT DOCUMENTS

WO WO-2008006041 A2 * 1/2008 ........... H04L 61/609

OTHER PUBLICATIONS

Harpreet Kaur, Layer 2 vs. Layer 3 addressing, Nov. 30, 2009, Cisco, https://community.cisco.com/t5/security-documents/layer-2-vs-layer-3-addressing/ta-p/3123440 (Year: 2009).*

*Primary Examiner* — Zi Ye
(74) *Attorney, Agent, or Firm* — Cooper Legal Group LLC

(57) ABSTRACT

Devices in enterprise-scale networks are often tracked by asset catalogs that record the physical locations of respective devices. Such tracking often involves administratively heavy communication of device deployment, and communication or recording errors may lead to missing catalog entries or entries that incorrectly identify the physical locations of the devices. Instead, a MAC address encoding may be established that maps physical locations to particular MAC addresses, such as representing a building, floor, room, row, and rack of a device in the second through sixth MAC address octets. A locator device with a network (Continued)

adapter featuring a selected MAC address that encodes a particular physical address may be inserted into a network device at the physical location. The physical location of the network device may thereafter be queried for the MAC addresses of connected devices, and the selected MAC address may be translated into the physical location of the network device.

20 Claims, 7 Drawing Sheets

(56) References Cited

U.S. PATENT DOCUMENTS

| | | | |
|---|---|---|---|
| 2015/0078402 A1* | 3/2015 | Diener | H04L 61/6022 370/475 |
| 2016/0057235 A1* | 2/2016 | Wu | H04L 41/0677 709/223 |

* cited by examiner

MAPPING NETWORK MAC ADDRESSES TO PHYSICAL LOCATIONS

BACKGROUND

Within the field of computing, many scenarios involve a deployment of devices in a network that spans a physical region, such as an enterprise-level network that covers a campus or a city. Such devices may include both endpoints (e.g., terminals and client devices) and infrastructure (e.g., network switches, access points, routers, and repeaters). Some devices may be portable, such as users' phones and laptops, and other devices may be relatively stationary, such as a set of servers deployed in a cluster.

Enterprise-level administration of the devices of a network depends upon detailed information about the collection of connected devices. Administrators often collect and rely upon such information, e.g., to audit the usage of the network, to maintain the security of the network, and to verify that the computing resources of the network are sufficient for demand. The collected information is often stored in an asset catalog that describes each device, including its device type, user ownership, resource allocation, permission to access secured resources, and physical location, particularly for relatively stationary devices. When an asset is added to or relocated within the network, the administrators may update the asset catalog.

SUMMARY

The tracking of network devices, particularly in a large-scale network such as an enterprise, may be difficult to maintain via asset catalogs. As a first example, an administrator who adds a device may be unaware of the asset catalog or may neglect to insert an entry; thereafter, a query for the properties of the device, including its physical location, may be unanswerable based on the asset catalog. As a second example, an administrator who relocates a device may fail to update the asset catalog, which may then reflect out-of-date information about the device, including its physical location. Such deficiencies may particularly occur during a large-scale deployment or relocation of assets, such as the provision or relocation of a server cluster, which may alter the physical locations of hundreds of servers; if the location of a particular server is not properly recorded in the asset catalog, the physical location of the server may be difficult to ascertain at a later time based on the asset catalog.

Presented herein are techniques that promote the tracking of physical locations of network devices in a network. In accordance with such techniques, a MAC address encoding may be established that maps particular physical locations to particular MAC addresses. A locator device comprising a network adapter may be provided, where the network adapter is assigned a selected MAC address that encodes a particular physical location. The locator device may establish a connection with a network device (e.g., a physical connection with a network switch), and may provide the particular MAC address to the network device. A subsequent query or request of the MAC addresses of devices that are connected to the network device may reveal the selected MAC address of the locator device, which may be translated into the physical location of the network device.

A first embodiment involves a method of specifying a physical location of a network device in a network using a locator device comprising a network adapter. The method involves providing a MAC address encoding that maps physical addresses to MAC addresses; assigning, to the network adapter of the locator device, a selected MAC address that maps to the physical location of the network device; and establishing a connection between the network device and the locator device.

A second embodiment involves a method of identifying a physical location of a network device in a network. The method involves querying the network device for a selected MAC address of a locator device having a connection with the network device, wherein the selected MAC address of the locator device is assigned according to a MAC address encoding that maps physical locations to MAC addresses; translating the selected MAC address of the locator device to a physical location according to the MAC address encoding; and identifying the physical location of the network device as the physical location mapped to the selected MAC address of the locator device.

A third embodiment involves a locator device that identifies a physical location of a network device. The locator device comprises a network adapter that comprises a MAC address that encodes a physical location according to a MAC address encoding; a MAC address receiver that receives a selected MAC address that, according to a MAC address encoding, maps to the physical location of the network device; and a MAC address presenter that, responsive to the network adapter establishing a connection with the network device, provides to the network device the selected MAC address assigned to the network adapter that encodes the physical location of the network device.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

While the techniques presented herein may be embodied in alternative forms, the particular embodiments shown in the drawings are only a few such examples that are supplemental of the description provided herein. These embodiments are not to be interpreted as limiting any aspect of the invention, which is defined by the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and systems. Accordingly, this subject matter is not intended to be construed as limited to any example embodiments set forth herein; example embodiments are provided merely to be illustrative. Such embodiments may, for example, take the form of hardware, software, firmware or any combination thereof (other than software per se). A reasonably broad scope for claimed or covered subject matter is intended.

Figure 1:
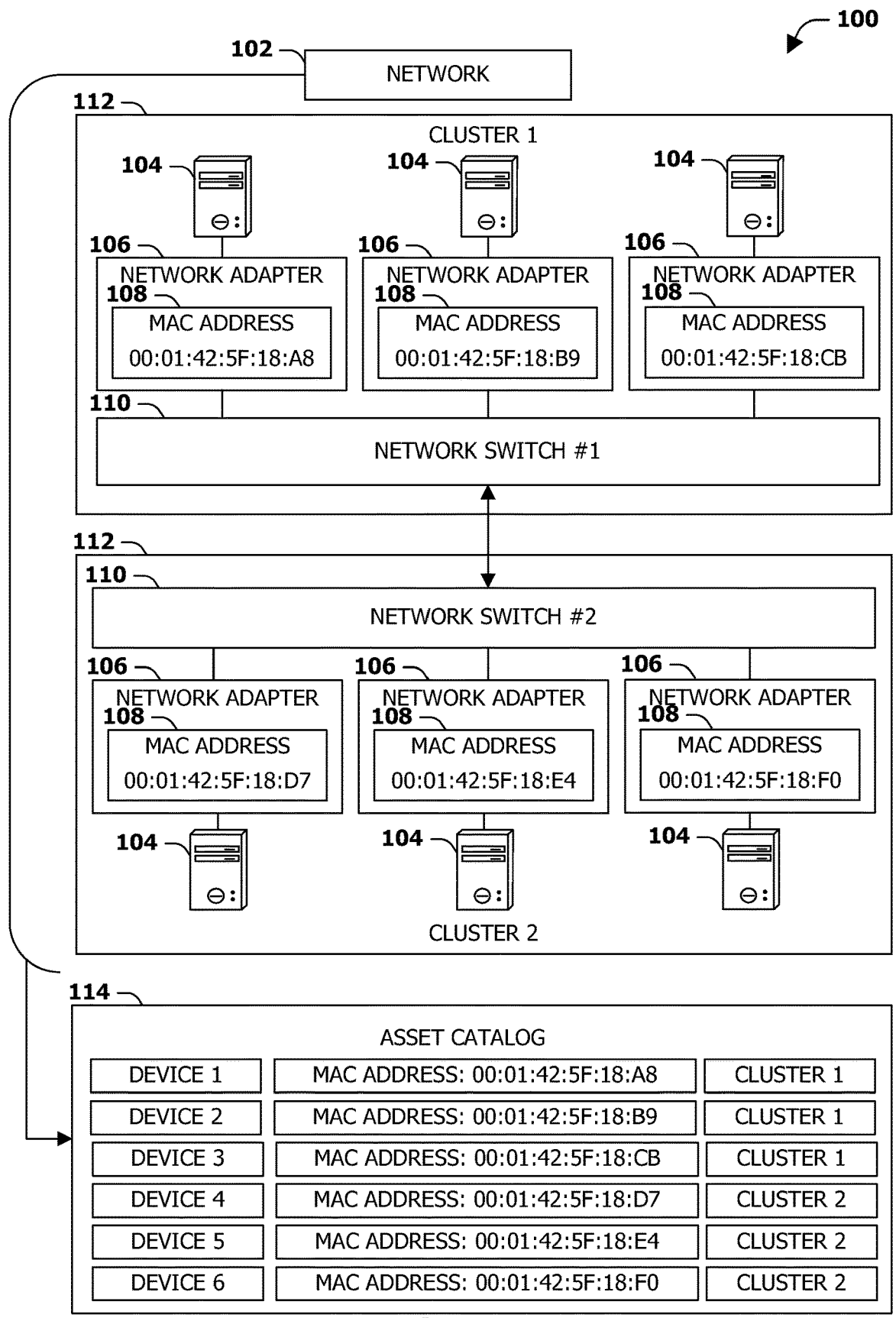
FIG. 1 is an illustration of a scenario involving a network of devices that are represented by an asset catalog.

FIG. 1 is an illustration of an example scenario 100 featuring a tracking of assets in a network 102 of intercommunication devices 104. In this example scenario 100, respective devices 104 connect to the network 102 using a network adapter 106, which provides networking technology that promotes communication among the devices 104 via protocols such as TCP, IP, and/or UDP. Respective devices 104 may be assigned an address, such as an IP address, and may communicate with other devices by generating message that include the IP address of a recipient. The devices 104 are connected to a network device, such as a network switch 110, which is capable of routing messages from a source to a recipient. For example, if a first device 104 presents a message that is to be delivered to a second device 104 that is connected to the same network switch 110, the network switch 110 may consult a routing table and determine that the IP address of the recipient is another device 104 connected to the same network switch 110, and may directly deliver the message to the recipient. Alternatively, if the message is addressed to a third device 104 that is connected to a second network switch 110, the first network switch 110 may route the message to the second network switch 110 for propagation and eventual delivery to the second device 104. The device 104 are further organized into clusters 112, e.g., subnetworks of devices 104 that are in close physical and/or network proximity, such as all of the devices 104 physically located in a first building vs. all of the devices 104 physically located in a second building.

As further illustrated in the example scenario 100 of FIG. 1, respective network adapters 106 may be assigned a media access control (MAC) address. Whereas an IP address is typically used for tasks such as message routing and delivery, the MAC addresses of the respective devices 104 serve to identify the device 104 to other devices 104 on the network 102. For example, a MAC address may comprise a set of six octets, each having a value between 0 and 255. The first three octets often comprise an organizationally unique identifier (OUI) that identifies a manufacturer of the network adapter 106, and the last three octets may uniquely identify the network adapter 106 from the identified manufacturer. Many network adapters 106 are provided with a MAC address 108 that is selected by the vendor (e.g., a "burned-in address" (BIA)). Some network adapters 106 allow a user-selectable MAC address 108, which may be altered to any value that the user desires. If the user wishes to set the address of a network adapter 106 in a manner that does not inadvertently indicate that the network adapter 106 was manufactured by a particular vendor, the user may use a locally administered address (LAA) wherein the first octet is set to xxxxxx10b. MAC addresses 108 within this portion of the MAC address space are identified as user-assigned, and do not conflict with the OUI of any vendor. When a device 104 establishes a connection with a network switch 110, the network adapter 106 typically reports its MAC address to the network switch 110. A particular device 104 may thereafter be identified within the network by its MAC address 108, even if its IP address changes. For example, the device 104 and network adapter 108 may exhibit different IP addresses for different tasks, such as communicating over the native local-area network or a virtual private network (VPN), or upon transitioning from communicating with a first network switch 110 to communicating with a second network switch 110. While the IP address of the device 104 may change to reflect a new routing path within the network, the MAC address 108 of the network adapter 106 may remain constant to promote consistent identification of the device 104 among the network switches 110.

As further provided in the example scenario 100 of FIG. 1, an asset catalog 114 may be developed that stores information about the respective devices 104, including its MAC address 108 and physical location, such as an identification of its cluster 112. The asset catalog 114 may enable administrators to track the number, kinds, deployment, and activity of the devices 104 comprising the network 102 in order to perform tasks such as auditing the collection of devices 104; maintaining the security of the network 102 and devices 104 (e.g., ensuring that only devices 104 recognized MAC addresses 108 are permitted to communicate on the network 102); and/or the sufficiency of the performance of the network 102. The asset catalog 114 may also promote maintenance and planning of the network 102. For example, if a particular cluster 112 is to be expanded, the asset catalog 114 may be consulted to determine the other devices 104 that are already part of the cluster 112 and that may be affected by the expansion unless additional networking resources are provided, such as partitioning the cluster into subclusters with dedicated network switches 110. In the performance of such tasks, the recording of the physical locations of devices 104 may be of significant value, e.g., to determine the subset of devices that are physically located in a particular area of the enterprise.

However, in many such scenarios, the development and maintenance of the asset catalog 114 is an administratively heavy process. When an administrator deploys a collection of devices 104 such as servers in a new physical area, the asset catalog 114 must be updated to add entries for the respective servers and to record the MAC addresses 108, physical locations, and other details of each server. If a server is reconfigured, relocated, or replaced, the asset catalog 114 must be updated to reflect the updated details of the device 104, including its updated physical location and/or new MAC address. If a server is removed from the network 102, its entry in the asset catalog 114 must be updated to reflect its removal. However, such centralized recording of device information in an asset catalog 114 may be prone to administrative errors, such as unawareness or unfamiliarity with the contents of the asset catalog 114; user entry errors that cause data to be incorrectly or inconsistently recorded; or neglect to update the asset catalog 114 when the details of the devices 104 change. In particular, if a cluster deployment involves the physical placement of dozens or hundreds of servers, the administrative task of updating the asset catalog 114 to identify every server by its MAC address 108 and physical location may be difficult to complete without at least a few errors. As a result, the asset catalog 114 may incorrectly reflect the deployment of resources in the network 102. For example, a device 104 that is connected to the network 102 may be inadvertently omitted from the asset catalog 114, causing the physical location of the device 102 to be difficult to determine. Similarly, if a device 104 is relocated, a failure to update the asset catalog 114 may cause subsequent queries to indicate that the device 104 remains in its original location rather than its new location; and if a device 104 is removed from the network 102, a failure to remove its entry in the asset catalog 114 may cause a location-based query to include the device 104 incorrectly as a member of a particular physical location. Moreover, broader errors may occur, such as corruption or loss of the asset catalog 114 or a version conflict between multiple versions of the asset catalog 114. Reconstructing the data contained therein may involve an administratively costly audit of the entire network 102. Many types of errors may arise in the administrative compilation of an asset catalog 114 as a mechanism for tracking the details (such as MAC addresses 108 and physical locations) of devices 104 connected to a network 102.

2. Presented Techniques

The techniques presented herein involve a different mechanism for representing and identifying the physical locations of devices 104 in a network 102 through the use of locator devices. A MAC address encoding is provided in which physical locations are mapped to MAC addresses. The locator devices are assigned a selected MAC address 106 that encodes a particular physical location, and are connected to a network device, such as a network switch, that is physically located at the encoded physical location. The network device may then be queried for the MAC addresses of connected devices, including the selected MAC address of the locator device, which may be translated according to the MAC address encoding to determine the physical location of the network device.

Figure 2:
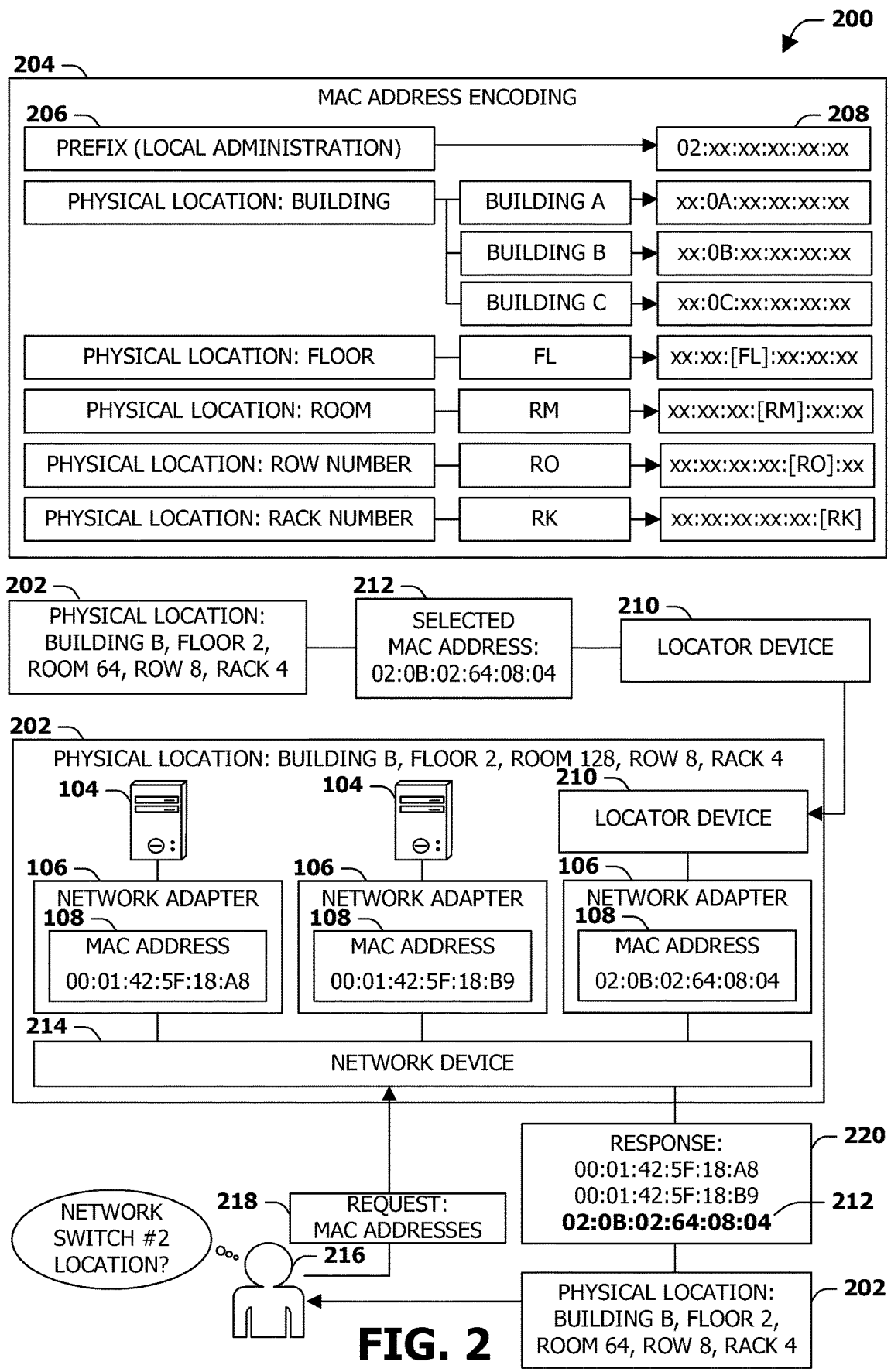
FIG. 2 is an illustration of a scenario involving an example network in which physical locations of network devices are identifiable by a locator device in accordance with the techniques presented herein.

FIG. 2 is an illustration of an example scenario 200 featuring a specification of the physical of a network device 214, such as a network switch. In this example scenario 200, network devices 214 may be deployed in a variety of physical locations 202, such as within one of three buildings (denoted A, B, and C); a set of floors within each building; a set of server rooms on each floor; a set of server rows within each server room; and a set of serer racks within each server row. In this example scenario 200, the MAC address encoding 204 includes a prefix, in which the first octet 208 is selected to identify the MAC address 108 as having been encoded in accordance with the MAC address encoding 204, e.g., by setting the first octet 208 to 0x02 to indicate a locally administered address (LAA) as per the low-order bits xxxxxx10b. The MAC address encoding 204 further maps each physical location component of a physical location 202 to one of the octets 208 of a MAC address 108. For example, the building component of the physical location is mapped to the second octet 208, encoding Building A as "0A," Building B as "0B," and Building C as "0C." The third octet 208 indicates the floor of the building; the fourth octet 208 indicates the room number of the server room on the floor; the fifth octet indicates the server row number within the server room; and the sixth number indicates the rack number within the server rack. Moreover, in this example, the MAC address encoding 204 uses binary-coded decimal numbering, such that room 64 is encoded as 0x64 rather than binary 0x40.

As further illustrated in the example scenario 200 of FIG. 2, a locator device 210 is provided that comprise a network adapter 106. The network adapter 106 is encoded with a selected MAC address 212 that encodes a physical location 202. The locator device 210 establishes a connection with a network device 214 that is physically located in the physical location 202 encoded by the selected MAC address 214. Upon establishing a connection, the locator device 210 reports the selected MAC address 108 to the network device 214, which records it in a set of MAC addresses 108 of the connected devices.

As further illustrated in the example scenario 200 of FIG. 2, a user 216 may desire to determine the physical location 202 of the network device 214. For example, the network device 214 may be reachable over the network to a user 216 located in Building B, and the user 216 may be able to communicate with the network device 214 and to determine its IP address; however, the user 216 may be may not be aware or certain of its particular physical location 202. The user 216 may therefore send a request 218 to the network device 214 to disclose the MAC addresses 108 of devices that are connected to the network device 214. The response 220 from the network device 214 may include all of the MAC addresses 108, including the selected MAC address 212 of the locator device 210. The user 216 may then translate the selected MAC address 212 may then be translated according to the MAC address encoding 204 to determine the corresponding physical location 202, which indicates the physical location 202 of the network device 214 to which the locator device 210 is connected, and optionally the physical location 202 of other devices 104 on the network 102 that are connected to the same network device 214 (e.g., servers that are connected to the same network switch into which the locator device has been inserted). In this manner, the user 216 may determine the physical location 202 of the network device 214 through the use of the selected MAC address 212 assigned to the locator device 210 according to the MAC address encoding 204 in accordance with the techniques presented herein.

3. Technical Effects

The specification and identification of physical addresses 202 of network devices 214 through the techniques presented herein may provide a number of technical advantages with respect to other techniques, including the asset catalog technique provided in the example scenario 100 of FIG. 1.

A first technical effect that may result from the use of the techniques presented herein involves the specification and identification of physical locations 202 of network devices 214 in a decentralized manner that does not depend on an asset catalog 114. For example, if the asset catalog 114 is not maintained, the information may become outdated; and if the asset catalog 114 is lost due to data corruption or the failure of a storage device, the redevelopment of the asset catalog 114 may be administratively costly. The techniques presented herein do not rely on an asset catalog 114 as a centralized store of information; rather, the information is encoded by the selected MAC addresses 212 of the locator devices 210 that are connected to the respective network devices 214. This decentralization reduces the likelihood of data failure and the administrative costs of the centralized administration of information. For example, a network-wide audit may be performed by requesting 218 the MAC address of each network device 214 and receiving, in response 220, the selected MAC addresses 212 of the locator devices 210 connected to each network device 214. Such information could be used to generate and/or update a centrally administrated asset catalog 114.

A second technical effect that may result from the use of the techniques presented herein involves the specification and identification of physical locations 202 of network devices 214 in a manner that involves no specialized communication protocols or networking technology. Rather, the techniques presented herein encode physical locations 202 using a particular assignment of MAC addresses 108, which are already collected and reported by network devices 214 such as network switches in the ordinary course of network management. That is, network devices 214 such as switches do not have to be reconfigured to utilize the techniques presented herein. Additionally, auditing processes to determine the physical locations 202 of one or more network devices 214 do not have to utilize a specialized network protocol; rather, the audit may involve simply querying the network device 214 for its collection of MAC addresses 108, which the network switch 214 automatically collects and reports as an ordinary network management function. The opportunity to encode physical locations 202 using existing technology and device configurations promotes the compatibility of the techniques presented herein with a wide range of network devices 214 (e.g., virtually every network device 214 that collects MAC addresses 108 of connected devices 104 may participate in the physical location specification and identification techniques) and facilitates the deployment of the physical location technique across an enterprise-scale network 102 (e.g., not depending on a reconfiguration of the network devices 214). Additionally, the techniques may be implemented without specialized training; an administrator simply inserts locator devices 210 into corresponding network device 214.

A third technical effect that may result from the use of the techniques presented herein involves the flexibility of the MAC address encoding 204, which may be selected to provide further advantages. As a first such example, the MAC address encoding 204 may be selected to provide a human-readable specification of the physical location 202. In the example scenario 200 of FIG. 2, the user 216 may determine the physical location 202 of the network device 214 simply by inspecting the selected MAC address 212: other than the first octet that encodes the prefix 206, the remaining octets ("0B:02:64:08:04") directly specify Building B, Floor 2, Room 64, Row 8, Rack 4. A user with minimal technical training may therefore utilize the reported information to determine the physical location 202 of the network device 214. As second such example, the MAC address encoding 204 may map other types of physical locations 202 to MAC addresses 108, such as geocoordinates indicating the latitude, longitude, and altitude of a network device 214 within a selected geocoordinate region. As a third such example, the MAC address encoding 204 may encode other information, such as physical properties of the local environment (e.g., light level, ambient temperature, and/or humidity) in addition to physical location 202. The flexibility of the MAC address encoding 204 may extend the use of the techniques presented herein to a wide range of scenarios and applications. These and other technical effects may be achieved through the specification and identification of physical locations 202 of network devices 214 in accordance with the techniques presented herein.

4. Example Embodiments

Figure 3:
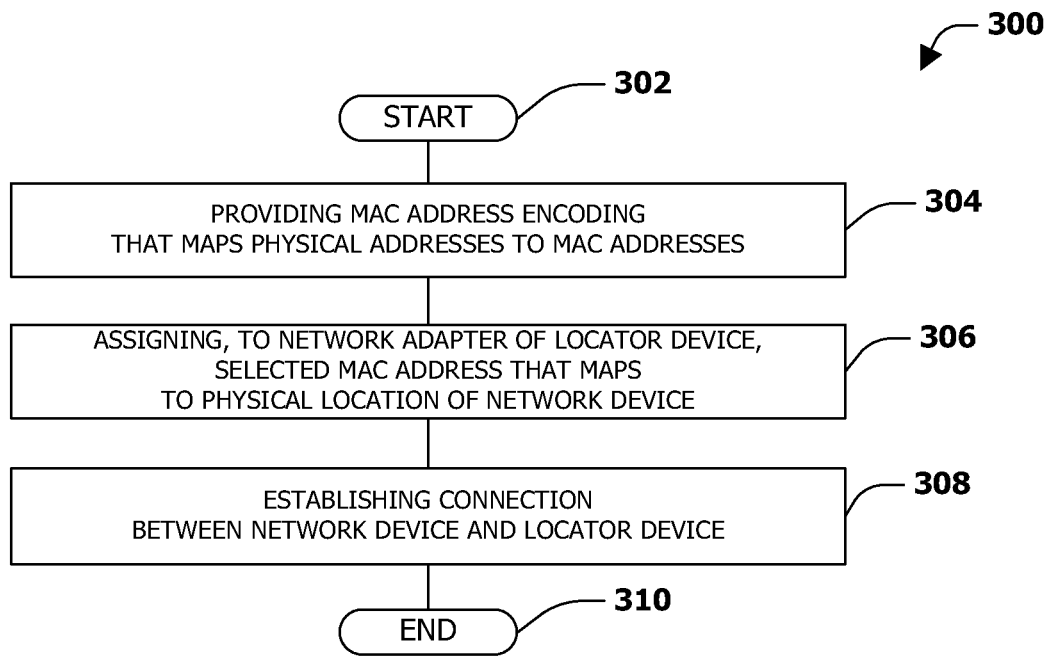
FIG. 3 is an illustration of an example method of specifying a physical location of a network device in accordance with the techniques presented herein.

FIG. 3 presents an illustration of a first example embodiment of the techniques presented herein, illustrated as an example method 300 of specifying a physical location 202 of a network device 214. The example method 300 may be implemented, e.g., as instructions stored in a memory (e.g., a hard disk drive, a solid-state storage device such as a flash memory device, or a magnetic or optical disc) that, when executed on a processor of a device, cause the device to assign selected MAC addresses 212 to locator devices 210 for use in accordance with the techniques presented herein. The example method 300 begins at 302 and involves providing 304 a MAC address encoding 204 that maps physical addresses 202 to MAC addresses 108. The example method 300 further involves assigning 306, to a network adapter 106 of a locator device 210, a selected MAC address 212 that maps to the physical location 202 of the network device 214. The example method 300 further involves establishing 308 a connection between the network device 214 and the locator device 210, which prompts the locator device 210 to communicate the selected MAC address 212 to the network device 214. Having achieved the communication from the locator device 210 to the network device 214 of the selected MAC address 212 that encodes the physical location 202 of the network device 214, the example method 300 ends at 310.

Figure 4:
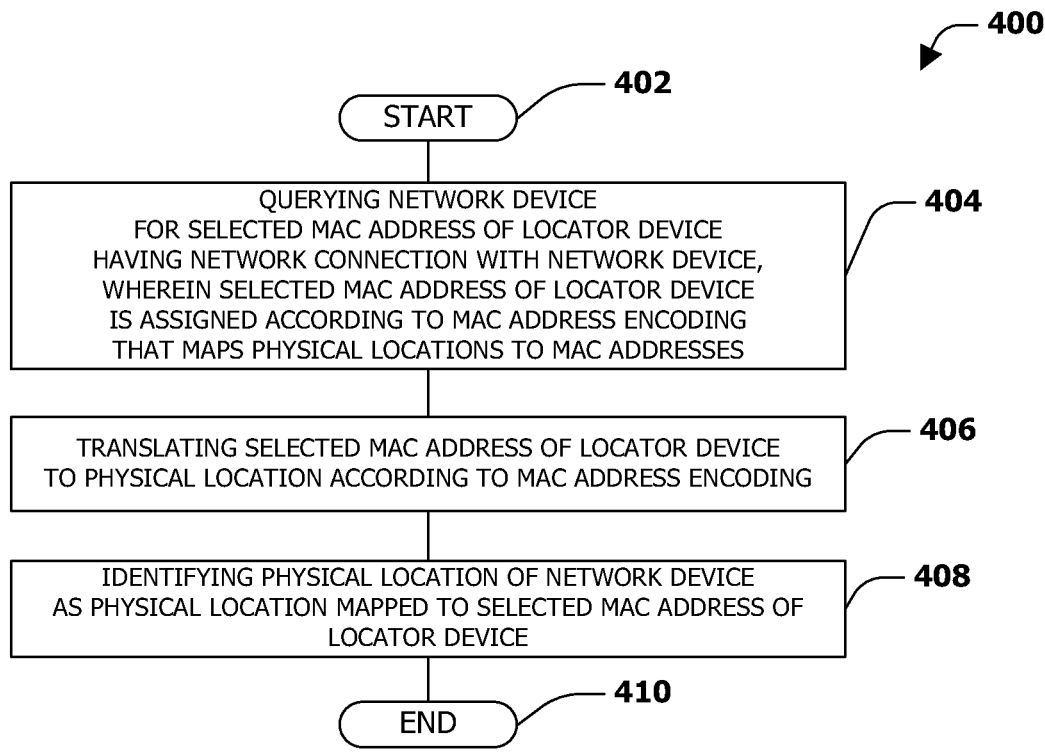
FIG. 4 is an illustration of an example method of identifying a physical location of a network device in accordance with the techniques presented herein.

FIG. 4 presents an illustration of a first example embodiment of the techniques presented herein, illustrated as an example method 400 of identifying a physical location 202 of a network device 214. The example method 400 may be implemented, e.g., as instructions stored in a memory (e.g., a hard disk drive, a solid-state storage device such as a flash memory device, or a magnetic or optical disc) that, when executed on a processor of a device, cause the device to query one or more network devices 214 to determine the respective physical locations 202 thereof. The example method 400 begins at 402 and involves querying 404 the network device 214 for a selected MAC address 212 of a locator device 210 having a connection with the network device 214, wherein the selected MAC address 212 of the locator device 210 is assigned according to a MAC address encoding 204 that maps physical locations 202 to MAC addresses 108. The example method 400 further involves translating 406 the selected MAC address 212 of the locator device 210 to a physical location 202 according to the MAC address encoding 204. The example method 400 further involves identifying 408 the physical location 202 of the network device 214 as the physical location 202 mapped to the selected MAC address 212 of the locator device 210. Having achieved the identification of the physical location 202 of the network device 214 according to the selected MAC address 212 of the locator device 210 connected thereto, the example method 400 ends at 410.

Figure 5:
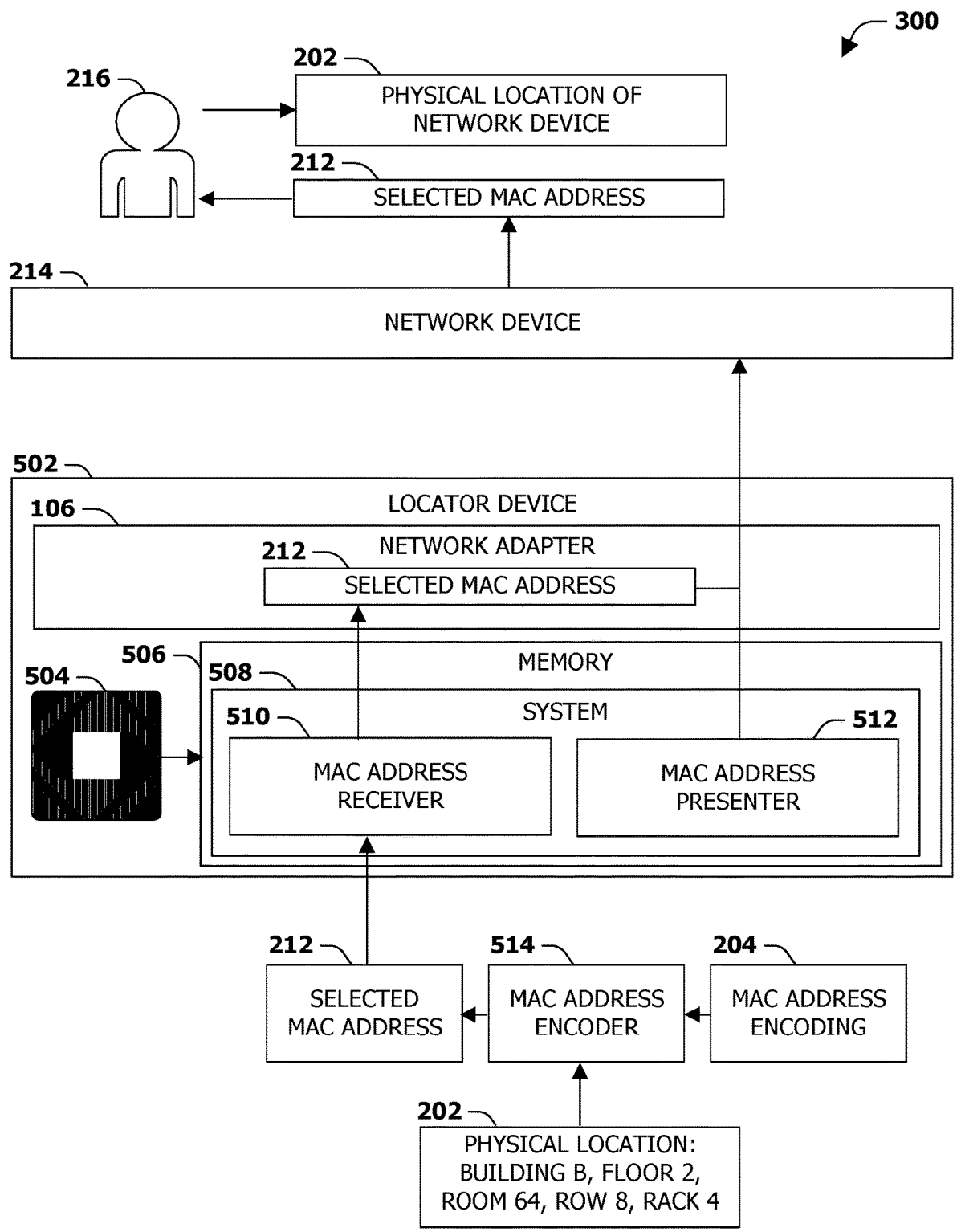
FIG. 5 is an illustration of an example scenario featuring an example locator device that specifies a physical location of a network device in accordance with the techniques presented herein.

FIG. 5 is an illustration of an example scenario 500 featuring a third example embodiment of the techniques presented herein, comprising an example locator device 502 that identifies a physical location 202 of a network device 214 such as a network switch. The example locator device 502 comprises a network adapter 106 that comprises a MAC address 108. The example locator device 502 further comprises a process 504 and a memory 506 storing instructions that, when executed by the processor 504, cause the example locator device 502 to generate a system 508 of components, wherein interoperation of the components causes the example locator device 502 to operate in accordance with the techniques presented herein. The example system 508 includes a MAC address receiver 510 that receives a selected MAC address 212 that, according to a MAC address encoding 202, maps to the physical location 204 of the network device 214. In this example scenario 500, the selected MAC address 212 is generated by a MAC address encoder 514, which receives a physical location 202 to be encoded (e.g., a designation of the physical location of the network device 214) and, in accordance with the MAC address encoding 204, generates the selected MAC address 212 for the example locator device 502. The example system 508 further includes a MAC address presenter 512 that, responsive to the network adapter 106 establishing a connection with the network device 214, provides to the network device 214 the selected MAC address 212 assigned to the network adapter 106 that encodes the physical location 204 of the network device 214. The network device 214 may then provide the selected MAC address 212 to a user 216 who wishes to determine the physical location 204 of the network device 214, and the user 216 may translate the selected MAC address 212 according to the MAC address encoding 202 to determine the physical location 202 of the network device 214 in accordance with the techniques presented herein.

Figure 6:
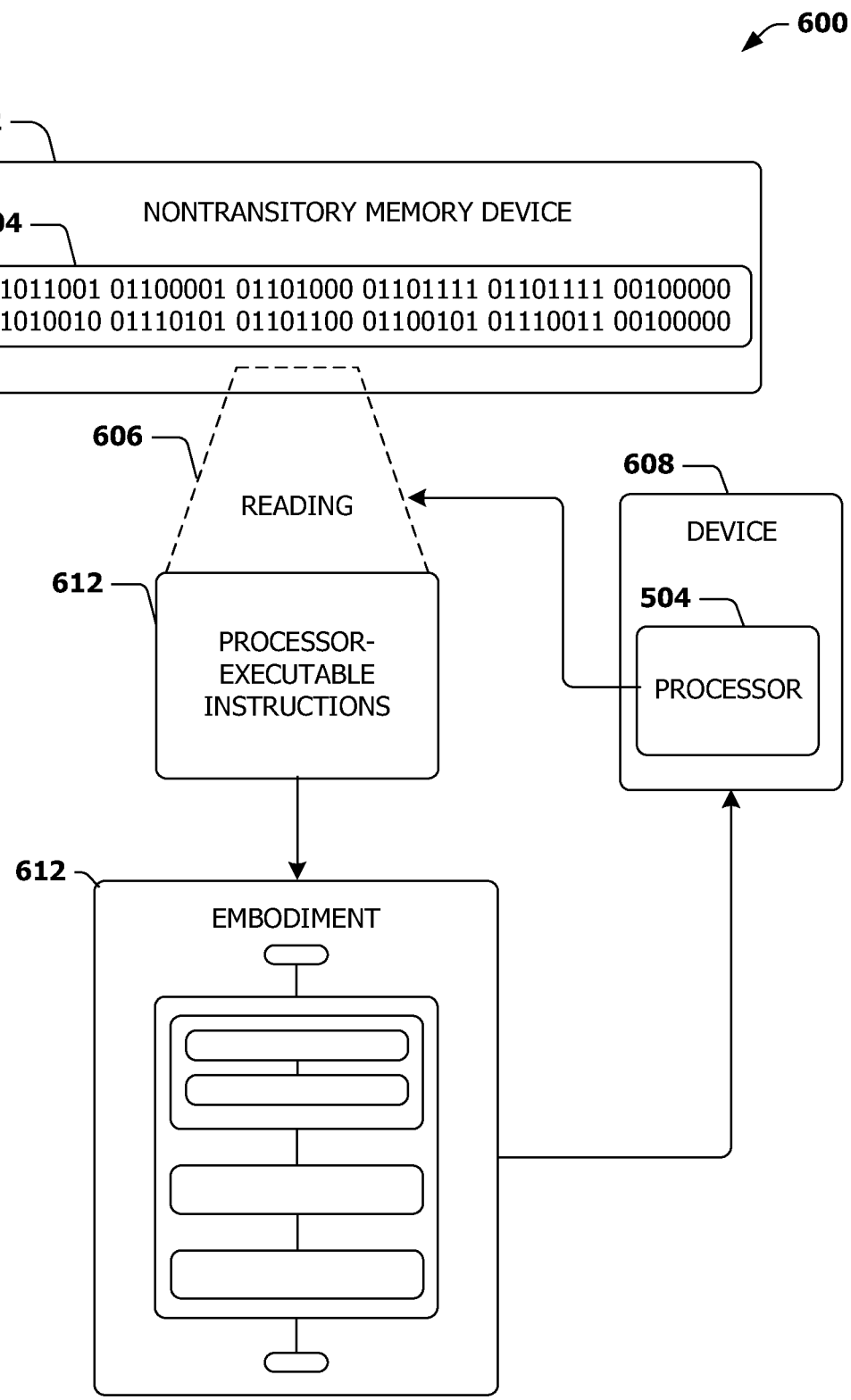
FIG. 6 is an illustration of a scenario featuring an example nontransitory memory device that causes a device to specify and/or identify physical addresses of network devices in accordance with the techniques presented herein.

FIG. 6 is an illustration of an example scenario 600 involving a fourth example embodiment of the techniques presented herein, comprising an example nontransitory memory device 602, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 602 stores computer-readable data 604 that, when subjected to reading 606 by a reader 610 of a device 608 (e.g., a read head of a hard disk drive, or a read operation invoked on a solid-state storage device), express processor-executable instructions 612. The processor-executable instructions 612, when executed on a processor 616 of the device 608, cause the device 608 to specify physical locations 202 of network devices 214 according to the selected MAC addresses 212 assigned to locator devices 212 in accordance with a MAC address encoding 204, such as the example method 300 of FIG. 3. Alternatively or additionally, the processor-executable instructions 612, when executed on a processor 616 of the device 608, cause the device 608 to identify the physical location 202 of a network device 214 according to the selected MAC addresses 212 assigned to locator devices 212 in accordance with a MAC address encoding 204, such as the example method 400 of FIG. 4. Many such types of computer-readable devices may be provided in accordance with the techniques presented herein.

5. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the example method 300 of FIG. 3; the example method 400 of FIG. 4; the example locator device 502 of FIG. 5; and/or the example nontransitory memory device 602 of FIG. 6) to confer individual and/or synergistic advantages upon such embodiments.

5.1. Scenarios

A first aspect that may vary among embodiments of the techniques presented herein involves the scenarios within which such techniques may be utilized.

As a first variation of this first aspect, the techniques presented herein may be utilized with a variety of network devices 214, such as network switches, hubs, routers, access points, and repeaters. The techniques presented herein may also be utilized with a variety of devices 102 connected to such network devices 214, such as workstations, laptop and palmtop computers, mobile phones, tablets, game consoles, media players, appliances, wearable devices, and vehicle control systems. In some variations, the locator device 210 may comprise a discrete physical device that is attached to the network device 214, e.g., an Ethernet- or USB-connectible component that attaches to the network device 214 using an integrated connector or a cable. In other variations, the locator device 210 comprises a component of the network device 214, such as a circuit that is integrated with the network device 214 (and connected to the network device 214 via an internal connection such as integrated traces) or a software system that executes on a processor of the network device 214 (and connected to the network device 214 via instantiation and/or initialization of execution on the processor of the network device 214). In some variations, the locator device 210 and/or the network device 214 may comprise a plurality or collection of devices 104, such as a cluster of computers, a set of interoperating network components, or a device "mesh" of devices that a user utilizes together, including a wristwatch, a mobile phone, and a tablet.

As a second variation of this first aspect, the techniques presented herein may be utilized with many types of networks. Such networks may utilize wired media such as coaxial cable, twisted pair, or fiber optic cable, wireless communication using various portions of the electromagnetic spectrum, or a combination thereof. Such networks may utilize a variety of scales and number of devices, including a local-area network interconnecting hundreds of devices, a metropolitan-area network interconnecting thousands of devices, and a wide-area network interconnecting millions of devices, such as the internet. Such networks may exhibit a variety of architectures, such as tree, star, token-ring, and mesh. Such networks may utilize a variety of protocols for networking and transport, including IP, ICMP, IGMP, TCP, UDP, and SCTP. Such networks may exchange a variety of data, such as text (including hypertext), images, sound, video, files, structured data such as XML, and automated device communication. Such networks may serve a variety of applications, such as web service, messaging such as email, streaming media, voice conferencing including VoIP, videoconferencing, gaming, and distributed computation. Many such variations may arise in the scenarios within which the currently presented techniques may be utilized.

5.2. Encoding of Physical Addresses to MAC Addresses

A second aspect that may vary among embodiments of the techniques presented herein involves the encoding of physical addresses that map to MAC addresses.

As a first variation of this first aspect, the encoding may represent various types of physical locations and at various types of scale. As a first such variation, the physical location may comprise a geographic location, such as a continent, country, region, city, street, or building. Such physical locations may be identified and encoded using geographic identifiers, such as geocoordinates or street addresses. As a second example, the physical location may comprise a localized location, such as a floor of a building, a room on a floor, a row within a room, or a rack within a row. Such physical locations may be identified and encoded using localized identifiers, such as an enumeration of room numbers. As a second such variation, the physical location may be identified an absolute manner, e.g., a selected geocoordinate; in other scenarios, the physical location may be identified as an offset with respect to a reference physical location, e.g., ten kilometers due east of a fixed physical location that is identified as an origin of a coordinate system, or three meters in and two meters to the right with respect to an entrance to a room. In some scenarios, the physical location is identified as a combination of a geographic location and a localized location. the physical locations may be identified using a variety of identifiers. As a third such variation, the physical location components by which a physical location is identified may be specified according to a variety of coordinate systems, such as a cartesian coordinate system, a cylindrical coordinate system, a spherical coordinate system, or a geocoordinate system.

As a second variation of this first aspect, the physical locations may be identified by a variety of physical location components. As a first such example, physical locations may be identified by a single physical location component, such as a geocoordinate (e.g., one or more numeric identifiers that identify a physical location along a physical axis, such as latitude, longitude, and/or altitude) or a single physical measurement (e.g., a physical distance offset with respect to a selected reference point, such as a number of meters away from a physical location serving as an origin). As a second such example, physical locations may be identified by a combination or sequence of physical location components, optionally at different scales, such as a first physical location component that identifies a geographic location such as a building and a second physical location component that identifies a localized location within the building. As an example, respective physical locations may be identified as a sequence, such as a building, a floor within the building, a room of servers within the floor, a row within the server room, and a rack within the row. As another example, respective physical locations may be identified by a sequence of grid coordinates, such as a first grid of 100-meter coordinates (e.g., a coordinate pair indicating a physical location of 400 meters east and 200 meters north of an origin) and a second grid of 1-meter coordinates (e.g., a coordinate pair indicating a physical offset of 12 meters east and 28 meters north of the first coordinate pair).

As a third variation of this first aspect, the MAC address encoding may map the identifier of a physical location into the MAC address space in a variety of ways. As a first such example, the identifier or identifier sequence may be encoded as a single value that is mapped into a portion of a MAC address. For example, the six-octet MAC address space may comprise a first octet (reserved to specify a locally administered address) and five octets that together encode five bytes. The encoding may specify that the physical identifier is encoded as a five-byte ASCII string, and the encoding may specify that octets 2-6 of the six-octet MAC address encode the respective ASCII values of the physical identifier string. As a second such example, the identifier or identifier sequence may be encoded as a series of values, e.g., a first pair of identifiers that encode a large-scale coordinate and a second pair of identifiers that encode a localized coordinate or coordinate offset (each value of the coordinate encoded as unsigned values, such as 0 to +100 or 0 to +255, or as signed values, such as −50 to +50 or −100 to +100). The encoding may specify that the first coordinate pair is encoded as octets 2-3 of the six-octet MAC address, and that the second coordinate pair is encoded as octets 4-5 of the six-octet MAC address. As a third such example, the identifier or identifier sequence may encode a sequence of values. As shown in the example scenario 200 of FIG. 2, physical locations are identified by a sequence of encoding such as a building, a floor, a room, a row number, and a rack number, each value encoded as a value within a 0-255 data space of one byte, and the MAC address encoding 204 maps the sequence of identifiers into each of octets 2 through 6 of a MAC address 208. In some variations, the physical location 202 may be specified in different ways, such as encoding both a geocoordinate and a building/room/row/rack sequence.

As a fourth variation of this second aspect, a MAC address encoding 204 may further specify a custom MAC address portion that distinguishes MAC addresses 208 that have been assigned according to the MAC address encoding 204 from MAC addresses 208 that have not been assigned according to the MAC address encoding 204. By convention, MAC address assignments a locally administered address (LAA) wherein the first octet is set to xxxxxx10b, such as hexadecimal values x2h, x6h, xAh, or xEh. The MAC address encoding 204 may specify a particular value within this space, such as 00000010b or 02h, wherein all network adapters 210 that have been assigned according to the MAC address encoding 204 begin with the value 00000010b or 02h, and all network adapters 210 that have not been assigned according to the MAC address encoding 204 begin with a value different than 00000010b or 02h.

As a fifth variation of this second aspect, a MAC address encoding 204 may include additional information to facilitate the encoding. As a first such example, the MAC address encoding 204 may specify that a portion of the assigned MAC address 208 distinctively identifies the locator device 210; e.g., a set of one hundred locator devices 210 deployed within an enterprise may be respectively assigned a locator device identifier in the range of 0 to 99, and an octet of the assigned MAC addresses 208 may be reserved to specify the locator device identifier assigned to the locator device 210. Such identifiers may facilitate the tracking of locator devices 210 within the enterprise, such as detecting that a locator device 210 has been relocated from a first physical location 202 to a second physical location 202. As a second such example, the MAC address encoding 204 may specify a plurality of encoding versions, and a portion of MAC addresses 208 assigned by the MAC address encoding 204 may indicate a version number of the version of the MAC address encoding 204 by which the MAC address 208 has been encoded. As a third such example, some MAC address encodings 204 may be of variable length (e.g., for a first room comprising a server room featuring a large number of servers, the MAC addresses 208 of devices within the server room may encode a row and rack number that are included in the identifier of the physical location 202; but for a second room storing a single server, the identifier of the physical location 202 may end with the room number). A MAC address encoding 204 for such variable-length physical location identification may specify, as part of assigned MAC addresses 208, a length of the identifier of the physical location. Alternatively, variable-length identifiers may be padded to a fixed length (e.g., appending 0 bits to shorter identifiers up to a maximum length such as 40 bits). As a fourth such example, a MAC address encoding 204 may specify that a portion of each encoded MAC address 208, such as octet 6, is to be used as a checksum of the encoded physical location that is provided in another portion of the encoded MAC address 208, such as octets 2-5.

As a sixth variation of this second aspect, a MAC address encoding 204 may specify that a physical location identifier encoded in the MAC address 208 is encoded in a human-readable manner, such as ASCII values that provide a human-readable MAC address encoding. For example, the MAC address encoding 204 may specify that octets 2-6 of assigned MAC addresses 208 encode ASCII values comprising a five-byte human-readable sequence that a user 216 who is familiar with the MAC address encoding 204 may readily understand, such as the letter "B" to designate building B and the digital or ASCII value "2" to indicate the second floor of building B. Alternatively, the MAC address encoding 204 may specify that a physical location identifier encoded in the MAC address 208 is to be encrypted using a particular encryption scheme (e.g., using a shared key), such that an unauthorized user 216 who received an encoded MAC address 208 is unable to determine the physical location 202 of a locator device 210. In some scenarios, the MAC address encoding 204 may specify that the physical identifier is to be encrypted in a variable manner, such as a time-variable encryption that is partly based on the time of day or the day of the year, and/or a device-variable encryption that is partly based on the device, such as a first encoding for devices within a first group that utilizes a first locally administered address (LAA) (e.g., first oct 02h) and a second encoding for devices within a second group that utilizes a second locally administered address (LAA) (e.g., first octet 12h).

As a seventh variation of this second aspect, a MAC address encoding 204 may specify that MAC addresses 208 assigned according to the MAC address encoding 204 may include additional information along with the identifier of a physical location 202. As a first example, a MAC address encoding 204 may specify that assigned MAC addresses 208 also encode one or more physical properties, which may be detectable by the locator device 210 comprising the network adapter 106 to which the MAC address 208 is assigned. In one such MAC address encoding 204, octets 2-5 of the assigned MAC address 208 may identify the physical location of the locator device 210, and octet 6 may encode the current device temperature or ambient temperature detected by the locator device 210. In such variations, the assignment of a MAC address 208 to a particular locator device 210 may involve receiving an instance of the physical property (e.g., querying an onboard, peripheral, or remote temperature sensor to detect a temperature) and assigning, to the network adapter 106 of the locator device 210, a selected MAC address 212 that maps to the physical location 202 of the locator device 210 and also specifies the instance of the physical property (e.g., choosing octet 6 as a binary value between 0 and 255 representing the integer value of the detected temperature in Celsius). A variety of physical properties may be included, such as an internal temperature of the locator device 210, the temperature of another device, ambient temperature, pressure, moisture such as humidity, light level, physical orientation (e.g., angle relative to horizontal), velocity, or acceleration. In an embodiment, the physical property may comprise a security parameter, such as a Boolean value indicating a detection of motion in the vicinity of the locator device 210 or a tamper value detected by a tamper sensor, such as an indication of whether or not a chassis of the locator device 210 or network device 214 has been opened. As a second such example, the MAC address encoding 204 may specify metadata about the physical location 202, such as the number of days that the locator device 210 has been located at the physical location 202. As a third such example, the MAC address encoding 204 may include multiple instances of the physical location 202 or physical property, such as a set of geocoordinates captured over time or the last five temperature measurements by a temperature sensor.

As an eighth variation of this second aspect, a MAC address encoding 204 may include more information than may be encoded in a single MAC address 208. As a first such example, the MAC address encoding 204 may specify physical locations using an identifier that requires ten bytes, which exceeds the information capacity of a six-octet MAC address 208. As a second such example, the MAC address encoding 204 may specify a plurality of physical location components that individually fit within the capacity of the six-octet MAC address 208, but that together exceed the capacity of the six-octet MAC address 208. As a third such example, the MAC address encoding may include an additional parameter (such as a physical property) that may vary over time, such as a temperature reading that fluctuates per sampling of a temperature sensor. In some scenarios, the locator device 210 may receive a static physical property (e.g., the locator device 210 may sample the ambient temperature once upon device initialization) and may encode the static physical property in the selected MAC address 212. However, in other sensors, the locator device 210 may receive a dynamic physical property (e.g., the locator device 210 may sample the ambient temperature periodically and/or upon request) and may alter the selected MAC address 212 to reflect the latest sampling of the dynamic physical property. In such scenarios, a MAC address encoding 204 may specify a sequence of MAC addresses 208 that are to be assigned to the network adapter 106 of the locator device 210 to encode the physical location 202 and, optionally, other information. Many such MAC address encodings 204 may be utilized to encode the physical locations 202 of locator devices 210 in accordance with the techniques presented herein.

5.3. Configuration of Locator Device

A third aspect that may vary among embodiments of the techniques presented herein involves the configuration of the locator device 210, including the assignment of a selected MAC address 212 to the network adapter 106 of a locator device 210 according to the MAC address encoding 204.

As a first variation of this third aspect, a locator device 210 may comprise a MAC address writable memory, and the locator device 210 (or a component thereof, such as a MAC address receiver 510) may store the selected MAC address 212 for the network adapter 106 in the MAC address writable memory, and may thereafter provide the selected MAC address 212 in response to a request 218. As a first such example, the locator device 210 may contain an electronically programmable nonvolatile memory, such as flash storage, which may be written with the selected MAC address 212 when programmed by a locator imprinter that specifies the physical location 202 to be encoded in the selected MAC address 212. For example, upon provisioning a room of servers, an administrator may flash-encode a set of locator devices 210 that identify the building and room number of the server room, as well as individual row and rack numbers, and may insert each locator device 210 into a server that is located at the physical location 202 flash-encoded on the locator device 210. As a second such example, when powered on and connected to a network device 214, the locator device 210 may receive the physical location 202 (e.g., from an onboard global positioning system (GPS) receiver, from the network device 214, or from a user 216) and may store the selected MAC address 212 to fulfill subsequent requests 218 for the MAC address 106 of the network adapter 106.

Alternatively, the locator device 210 may dynamically determine the selected MAC address 212 in response to a request 218 for the MAC address 108 of the network adapter 106. For example, periodically or responsive to a request 218 for the MAC address 108 of its network adapter 106, the locator device 210 may query a position determiner, such as an onboard global positioning system (GPS) receiver, for an instance of the physical location of the locator device 210, and may translate the instance of the physical location to a selected MAC address 212 that encodes the geocoordinate identifying the physical location 202 of the locator device 210 according to the MAC address encoding 204.

As a second variation of this third aspect, some MAC address encodings 204 may specify that selected MAC addresses 212 also encode an instance of a physical property, such as a measurement by a sensor of the locator device 210 (e.g., temperature, pressure, moisture, humidity, light level, motion detection, orientation, velocity, acceleration, and/or tamper condition). The assignment of the selected MAC address 212 may therefore involve receiving, from a sensor, an instance of a physical property, encoding the instance of the physical property in the selected MAC address 212 assigned to the network adapter 106 according to the MAC encoding scheme 204.

As a third variation of this third aspect, some MAC address encodings 204 may provide that selected MAC addresses 212 encode dynamic properties and/or too much information to fit within the address space of a single selected MAC address 212. For example, the MAC address encoding 204 may map respective physical locations 202 to a set of at least two selected MAC addresses 212 (e.g., a first selected MAC address 212 indicating a high-precision latitude portion of a geocoordinate and a second selected MAC address 212 indicating a high-precision longitude portion of the geocoordinate). Accordingly, the locator device 210 may receive and report different selected MAC addresses 212 in accordance with the MAC address encoding 204.

As a first example of this third variation of this third aspect, a locator device 210 may receive a set of at least two selected MAC addresses 212 and provide, to the network device 214, a sequence of the at least two selected MAC addresses 212 (e.g., reporting the first selected MAC address 212 for the network adapter 106 at a first time or in response to a first request 218, and reporting the second selected MAC address 212 for the network adapter 106 at a second time or in response to a second request 218). Each time the locator device 210 reports its MAC address 208 (either spontaneously, such as periodically, and/or in response to a query), the locator device 210 may report a different selected MAC address 212 that presents a portion of the information reported according to the MAC address encoding 204, wherein a collection of the at least two selected MAC addresses 212 together encode the physical location 202 of the locator device 210 and, in some scenarios, additional information such as physical properties. For example, if the information in the MAC address encoding 204 exceeds the six-octet data space of MAC addresses 208, the MAC address encoding 204 may specify that the locator device 210 is to paginate the data over several selected MAC addresses 208. A first selected MAC address 212 reported by the locator device 210 may specify a first page number and a first portion of the encoded information, and a second selected MAC address 212 reported by the locator device 210 may specify a second page number and a second portion of the encoded information, wherein the concatenation of the first portion and the second portion fully specifies the physical location 202 of the locator device 210 and optional other information. The pagination may vary periodically (e.g., rotating through two or more selected MAC addresses 212 per second) or by report (e.g., reporting the first selected MAC address 212 in response 220 to a first request 218 and reporting the second selected MAC address 212 in response 220 to a second request 218). As another example, if the MAC address encoding 204 includes a dynamic physical property such as temperature, the locator device 210 may report a series of selected MAC addresses 212 when queried over time, wherein each selected MAC address 212 includes a recent sampling of the dynamic physical property.

As a second example of this third variation of this third aspect, a locator device 210 may concurrently report a plurality of selected MAC addresses 212. For example, the locator device 210 may receive a set of at least two selected MAC addresses 212 and provide, to the network device 214, the set of the at least two selected MAC addresses 212 assigned to the network adapter 106 (e.g., reporting the network adapter 106 as concurrently identified by two or more selected MAC addresses 212 that, together, identify the physical location 202 and optional additional information of the locator device 210). The network adapter 106 may report at least two selected MAC addresses 212 that are concurrently assigned to the network adapter 106 of the locator device 210, wherein the combination of the at least two selected MAC addresses 212 fully encodes the physical location 202 and optional other information of the locator device 210. As a second such example, the locator device 210 may have a plurality of network adapters 106 (and/or may simulate the presentation of a plurality of network adapters 106) and may assign a different selected MAC address 212 to the respective network adapters 106, wherein the aggregation of the different selected MAC addresses 212 of the respective network adapters 106 encodes the physical location 202 and optional additional information of the locator device 210.

As a third example of this third variation of this third aspect, a set of locator devices 210 may each comprise a network adapter 106 that is assigned a selected MAC address 212 that encodes a portion of the physical location 202 and optional additional information, wherein the aggregation of the selected MAC addresses 212 assigned to a plurality of locator devices 210 that are connected to a single network device 214 encodes the physical location 202 and optional additional information according to the MAC address encoding 204. As an example, the selected MAC address 212 of a first locator device 210 may encode a first portion of a geocoordinate identifying the physical location 202 of the network device 214; the selected MAC address 212 of a second locator device 210 may encode a second portion of the geocoordinate identifying the physical location 202 of the network device 214; and the selected MAC address 212 of a third locator device 210 may encode an ambient temperature of the local environment of the locator device 210.

As a fourth variation of this third aspect, the configuration of the locator device 210 may involve other network configuration parameters. For example, the locator device 210 may comprise a typical device connected to the network device 214 (e.g., a data server, workstation, terminal, or mobile device such as a tablet or phone) that, in addition to performing other useful tasks, reports a selected MAC address 212 that identifies the location of the network device 214. Alternatively, the locator device 210 may be limited to identifying the physical location 202 of the network device 214. For example, a MAC address presenter 512 of a locator device 210 may provide the selected MAC address 212 according to a data layer network protocol of a network 102, and the network adapter 106 may otherwise be configured to refrain from responding to network traffic above the data layer network protocol of the network 102. Such a locator device 210 may exhibit a reduced vulnerability profile for malicious use, because the locator device 210 refrains from exposing any other services that may be exploited.

Figure 7:
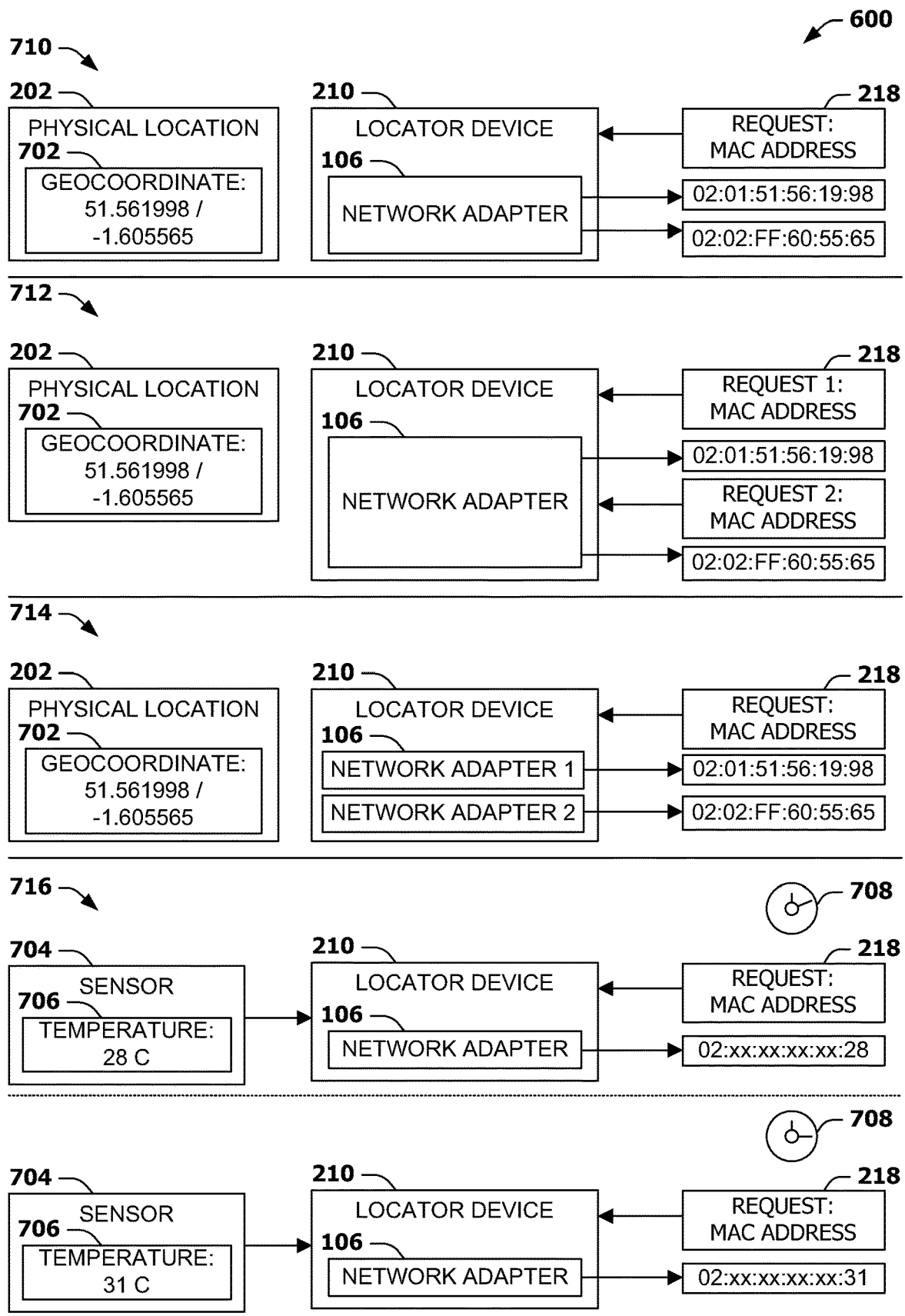
FIG. 7 is an illustration of example scenarios featuring an encoding of physical locations across a set of selected MAC addresses in accordance with the techniques presented herein.

FIG. 7 is an illustration of a set of example scenarios 700 featuring some techniques for encoding information as a set of selected MAC addresses 212 of a locator device 502. In a first example scenario 710, a locator device 210 receives a physical location 202 comprising a geocoordinate 702 comprising two coordinate components, wherein the full resolution of the geocoordinate 702 cannot be encoded in a single selected MAC address 212. Instead, the locator device 210 responds to a request 218 for the MAC address 108 of its network adapter 106 by providing both a first selected MAC address 212 specifying the first coordinate component and a second selected MAC address 212 specifying the second coordinate component. In a second example scenario 712, the locator device 210 responds to a first request 218 for the MAC address 108 of its network adapter 106 by providing a first selected MAC address 212 specifying the first coordinate component, and responds to a second request 218 by providing a second selected MAC address 212 specifying the second coordinate component. In a third example scenario 714, the locator device 210 responds to a request 218 for the MAC address 108 of its network adapter 106 by reporting two network adapter 106, the first network adapter 106 assigned a first selected MAC address 212 specifying the first coordinate component, and the second network adapter 106 assigned a second selected MAC address 212 specifying the second coordinate component. In each of these scenarios, the order of the coordinates comprising the geocoordinate 702 may be identified by the second octet of the selected MAC address 212 as a sequence or page number. In a fourth example scenario 716, the locator device 210 includes a temperature sensor 704 that detects a fluctuating temperature 706 of the locator device 210. At a first time 708 and in response to a first request 218 for the MAC address 108 of the network adapter 106, the locator device 210 may provide a first selected MAC address 212 that specifies the temperature 706 at the first time 708 (e.g., as the last octet, whereas other octets are used to specify the physical location 202 of the locator device 210). At a second time 708 and in response to a second request 218 for the MAC address 108 of the network adapter 106, the locator device 210 may provide a second, different selected MAC address 212 that specifies the temperature 706 at the second time 708. In these and other ways, the locator device 210 may utilize variable selected MAC addresses 212 to report the physical location 202 and other information. Many techniques may be utilized to configure locator devices 210 to receive and report selected MAC addresses 212 in accordance with the techniques presented herein.

5.4. Identifying Physical Locations of Network Devices

A fourth aspect that may vary among embodiments of the techniques presented herein involves identifying the physical locations 202 of network devices 214 according to the selected MAC addresses 212 of locator devices 210 connected thereto.

As a first variation of this fourth aspect, a user 216 or device may determine the physical locations 202 of network devices 214 of a network 102 by first querying the network 102 to identify any and all network devices 214 (e.g., a broadcast request for network devices 214 to report their identities, and/or a stepwise exploration of the infrastructure of the network 102, such as iteratively asking a particular network device 214 to identify other network devices 214 connected thereto). For example, the network device 214 may further comprise a network switch, and the broadcast request may query the network 102 to identify a collection of network switches that includes at least one network device 214 to which a locator device 210 is attached. For each network device 214 that responds to the query, the user or device may request, from the network device 214, the MAC addresses 108 of network adapters 106 that are connected to the network device 214. The response from the network device 214 may include a list of at least one MAC address 108 of at least one device, which may include a selected MAC address 212 that is assigned to a locator device 120 connected to the network device 214, where the selected MAC address 212 encodes the physical location 202 of the network device 214. The selected MAC address 212 may be distinctive and identifiable among the set of MAC addresses 108 by including a custom MAC address portion indicating that the selected MAC address 212 encodes the physical location 202 of the network device 214 according to the MAC address encoding 204. For example, the MAC address encoding 204 may specify that selected MAC addresses 212 include a particular locally administered address (LAA) identifier, such as a first octet with the value 00000010b or 02h). In this manner, the physical locations 202 of network devices 214 may be determined without resort to an asset catalog 114, e.g., because an asset catalog 114 of network assets is not maintained, and/or because the asset catalog 114 has been lost or corrupted. Alternatively, the physical locations 202 of network devices 214 may be compared with the contents of an asset catalog 114 to verify the accuracy and currency of the location information contained therein. If omissions or inaccuracies are discovered, the decoded physical locations 202 may be used to update the asset catalog 114 of network devices 214 to indicate an updated physical location 202 of the network device 214. Alternatively or additionally, the physical locations 202 may be presented to a user 216, e.g., in response to an inquiry about the physical location 202 of a particular network device 214, or as a map that shows the physical locations 202 of network devices 214 comprising a network 102.

As a second variation of this fourth aspect, a MAC address encoding 204 may map respective physical locations 202 to a set of at least two selected MAC addresses 212, which may together identify the physical location 202 and, optionally, additional information. Accordingly, determining the physical location 202 of a network device 214 may involve receiving and aggregating at least two selected MAC addresses 212. As a first such example, the translating may further comprise receiving at least two selected MAC addresses 212 that are assigned to one locator device 210 and translating the at least two selected MAC addresses 212 to the physical location 202 according to the MAC address encoding 204. The receiving may involve querying the locator device 210 and/or network device 214 twice and receiving a sequence of at least two selected MAC addresses 21. As a second such example, the receiving may involve querying the locator device 210 and/or network device 214 once and receiving at least two selected MAC addresses 212 that are concurrently assigned to the same network adapter 106, or that are concurrently assigned to two or more different (physical or simulated) network adapters 106 of the same locator device 210. As a third such example, the querying may involve receiving selected MAC addresses 212 for at least two locator devices 210 that are connected to the same network device 214 and aggregating the selected MAC addresses 212 of at least two locator devices 210.

As a third variation of this fourth aspect, other information that is encoded in the selected MAC address 212 along with the physical location 202 of the network device 214 may be translated and utilized. For example, a selected MAC address 212 may further encode an instance of a physical property of the locator device 210, and the querying may involve extracting the instance of the physical property encoded in the selected MAC address 212 of the locator device 210. Such information may be presented to a user (e.g., as a map of ambient temperatures detected by the locator devices 210 throughout a room of servers) and/or evaluated against reporting criteria to determine reporting events (e.g., determining that the ambient temperature detected by locator devices 210 within a certain portion of a server room exceed a temperature threshold, or that motion or tamper information provided by locator devices 210 within a particular server room indicates a security event).

Figure 8:
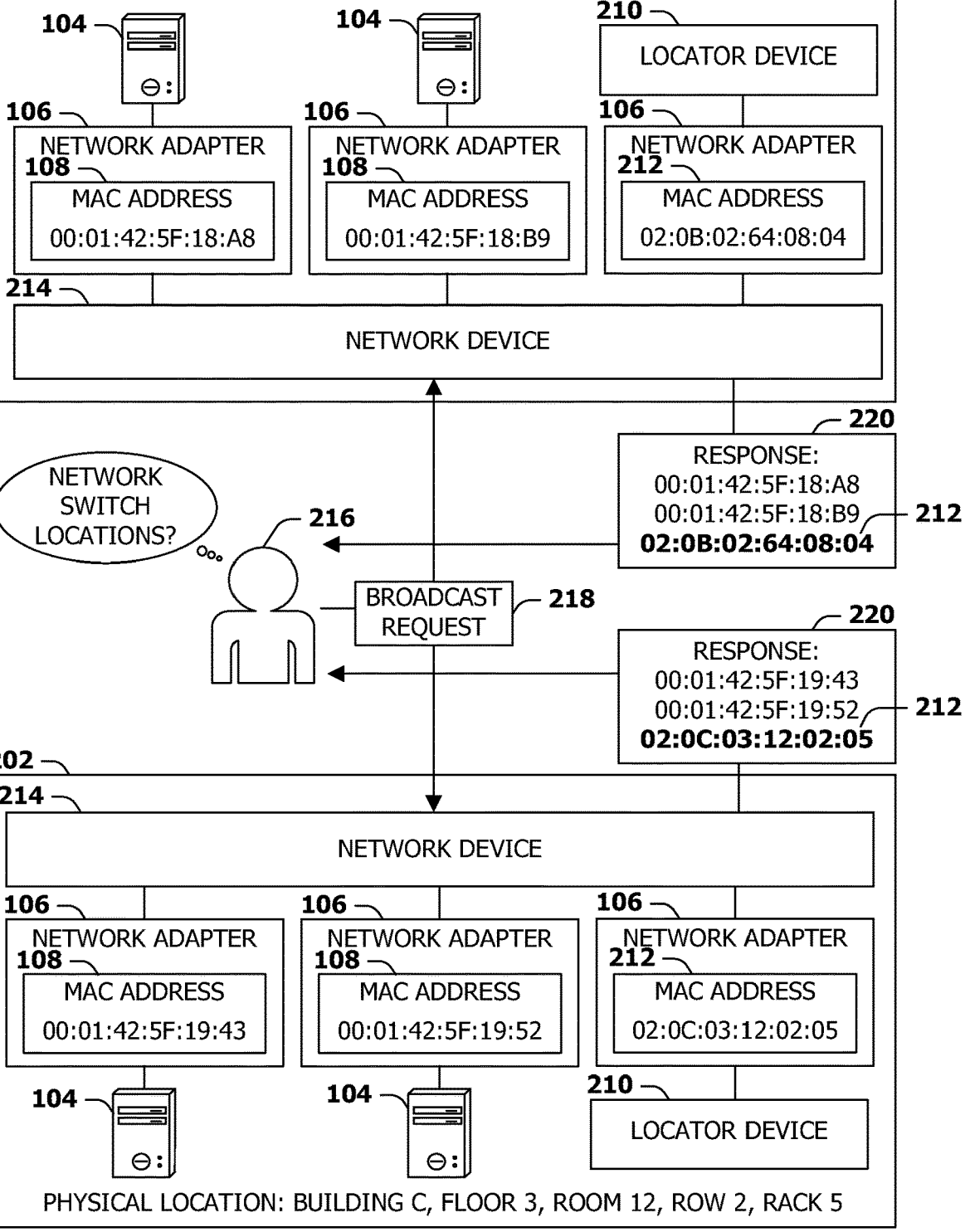
FIG. 8 is an illustration of an example scenario featuring a mapping of physical locations of network switches in accordance with the techniques presented herein.

FIG. 8 is an illustration of an example scenario 800 featuring a technique for identifying physical locations 202 of various network devices 214 in accordance with the techniques presented herein. In this example scenario 800, a network 102 comprises at least two network devices 214, such as network switches that are deployed in different physical locations 202, such as different buildings of a campus. Each network device 214 is coupled with a set of devices 104 via network adapters 106 to which MAC addresses 108 have been assigned, including a locator device 210 with a selected MAC address 212 that has been assigned according to a MAC address encoding 202 and that indicates the physical location 202 of the locator device 210 and, by extension, the physical location 202 of the network device 214. A user 216 who wishes to identify the physical locations 202 of the network 104 may issue a broadcast request 218 for network devices 214 to self-identify and, concurrently or consecutively, a request for each network device 214 to identify the MAC addresses 108 of the devices 104 connected thereto. Each network device 214 receives the broadcast request 218 and provides a response 220 including the MAC addresses 108 of the connected devices, including the selected MAC addresses 212 that map to the locations of the network devices 214. The user 216 may examine the responses 220, identify the selected MAC addresses 212 (e.g., which may be distinctive due to the inclusion of a particular locally administered address (LAA) indicator), and examine the human-readable selected MAC addresses 212 to identify the locations of the network devices 214. It is noted that this scenario 800 does not rely on an asset catalog 114 to identify the network devices 214, nor utilizes a special configuration of the network devices 214, which collect and report MAC addresses 108 of connected devices 104 that include the selected MAC addresses 212 of the locator device 210. Many such techniques may be provided to collect and utilize physical locations 202 and additional information encoded in selected MAC addresses 212 in accordance with the techniques presented herein.

6. Usage of Terms

Although the subject matter has been described in language specific to structural features and/or methodological acts, the subject matter defined in the appended claims is not necessarily limited to the specific features or acts described above. Rather, the specific features and acts described above are disclosed as example implementations of the claims.

Although the disclosed subject matter has been shown and described with respect to one or more implementations, equivalent alterations and modifications may occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application.

The claimed subject matter may be implemented in various ways, such as a method, an apparatus, or an article of manufacture. Each such implementation may utilize standard programming and/or engineering techniques to produce software, firmware, hardware, or any combination thereof to control a computer to implement the disclosed subject matter. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

As used herein and unless specified otherwise or clear from context, terms such as "and", "or", or "and/or," may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense.

As used herein and unless specified otherwise or clear from context, the term "or" is intended to mean an inclusive "or" rather than an exclusive "or".

As used herein and unless specified otherwise or clear from context, the terms "a," "an," or "the" may convey either a singular usage or a plural usage.

As used herein and unless specified otherwise or clear from context, the terms "first," "second," etc. are not intended to imply a temporal aspect, a spatial aspect, an ordering, etc. Rather, such terms are merely used as identifiers, names, etc. for features, elements, items, etc. For example, the terms "a first object" and "a second object"

generally correspond to object A and object B, or two different objects, or two identical objects, or the same object.

As used herein and unless specified otherwise or clear from context, the terms "includes", "having", "has", "with", and variants thereof are used in either the detailed description or the claims, such terms are intended to be inclusive in a manner similar to the term "comprising."

As used herein and unless specified otherwise or clear from context, the phrase "at least one of," such as "at least one of A and B," generally means A, or B, or both A and B.

As used herein and unless specified otherwise or clear from context, the term "example" is used herein to mean serving as an example, instance, illustration, etc., and not necessarily as advantageous. Any aspect or design described herein as "example" is not necessarily to be construed as advantageous over other aspects or designs. Rather, use of the word example is intended to present concepts in a concrete fashion.

As used herein and unless specified otherwise or clear from context, the term "based on" may be understood as not necessarily intended to convey an exclusive set of factors and may, instead, allow for existence of additional factors not necessarily expressly described, again, depending at least in part on context.

As used herein and unless specified otherwise or clear from context, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

As used herein and unless specified otherwise or clear from context, the term "article of manufacture" as used herein is intended to encompass a computer program accessible from any computer-readable device, carrier, or media.

The invention claimed is:

1. A method of specifying a physical location of a network device in a network using a locator device comprising a network adapter, the method comprising:
   providing a MAC address encoding that maps physical addresses to MAC addresses;
   assigning, to the network adapter of the locator device, a selected MAC address that maps to the physical location of the network device; and
   establishing a connection between the network device and the locator device,
   wherein at least one of:
      assigning the selected MAC address to the locator device further comprises:
         assigning, to the locator device, at least two MAC addresses that together specify the physical location of the network device; or
      the physical location of the network device comprises at least two of:
         a building;
         a floor in the building;
         a server room on the floor;
         a server row in the server room; or
         a server rack in the server row.

2. The method of claim 1, wherein the MAC address encoding further specifies a custom MAC address portion that distinguishes MAC addresses that have been assigned according to the MAC address encoding from MAC addresses that have not been assigned according to the MAC address encoding.

3. The method of claim 1, wherein assigning the selected MAC address further comprises:
   assigning the selected MAC address as a locally administered address.

4. The method of claim 1, wherein:
   respective physical locations further comprise a set of physical location components; and
   the MAC address encoding further maps the respective physical location components of the physical location of the network device to an octet of the selected MAC address of the locator device.

5. The method of claim 1, wherein:
   the MAC address encoding further encodes a physical property; and
   assigning the selected MAC address to the locator device further comprises:
      receiving an instance of the physical property; and
      assigning, to the network adapter of the locator device, the selected MAC address that maps to the physical location of the network device and that specifies the instance of the physical property.

6. The method of claim 1, wherein:
   the MAC address encoding further maps physical locations to a set of two or more MAC addresses; and
   assigning the selected MAC address to the locator device further comprises:
      assigning, to the locator device, the at least two MAC addresses that together specify the physical location of the network device.

7. A locator device that identifies a physical location of a network device, the locator device comprising:
   a network adapter that comprises a MAC address that encodes a physical location according to a MAC address encoding; and
   a processor that implements:
      a MAC address receiver that receives a selected MAC address that, according to the MAC address encoding, maps to the physical location of the network device; and
      a MAC address presenter that, responsive to the network adapter establishing a connection with the network device, provides to the network device the selected MAC address assigned to the network adapter that encodes the physical location of the network device,
   at least one of:
      wherein:
         the MAC address encoding further maps physical locations to a set of two or more MAC addresses;
         the MAC address receiver further receives a set of at least two MAC addresses; and
         the MAC address presenter further provides to the network device at least one of:
            a sequence of the at least two MAC addresses; or
            the set of the at least two MAC addresses assigned to the network adapter; or
      wherein the physical location of the network device comprises at least two of:
         a building;
         a floor in the building;
         a server room on the floor;

a server row in the server room; or
a server rack in the server row.

8. The locator device of claim 7, wherein:
the locator device further comprises a MAC address writable memory; and
the MAC address receiver further stores the selected MAC address for the network adapter in the MAC address writable memory.

9. The locator device of claim 7, wherein:
the locator device further comprises a position determiner that determines a physical position of the locator device;
the MAC address receiver is further configured to:
receive an instance of the physical position of the locator device from the position determiner; and
translate the instance of the physical position into the selected MAC address of the network adapter according to the MAC address encoding.

10. The locator device of claim 7, wherein:
the locator device further comprises a sensor that senses a physical property; and
the MAC address presenter is further configured to:
receive from the sensor an instance of the physical property; and
encode the instance of the physical property in the selected MAC address.

11. The locator device of claim 7, wherein:
the MAC address presenter provides the selected MAC address according to a data layer network protocol of a network; and
the network adapter is configured to refrain from responding to network traffic above the data layer network protocol of the network.

12. The locator device of claim 7, wherein:
the MAC address encoding further maps the physical locations to the set of two or more MAC addresses;
the MAC address receiver further receives the set of at least two MAC addresses; and
the MAC address presenter further provides to the network device the sequence of the at least two MAC addresses.

13. The locator device of claim 7, wherein:
the MAC address encoding further maps the physical locations to the set of two or more MAC addresses;
the MAC address receiver further receives the set of at least two MAC addresses; and
the MAC address presenter further provides to the network device the set of the at least two MAC addresses assigned to the network adapter.

14. A method of identifying a physical location of a network device in a network, the method comprising:
querying the network device for a selected MAC address of a locator device having a connection with the network device, wherein the selected MAC address of the locator device is assigned according to a MAC address encoding that maps physical locations to MAC addresses;
translating the selected MAC address of the locator device to a physical location mapped to the selected MAC address of the locator device according to the MAC address encoding; and
identifying the physical location of the network device as the physical location mapped to the selected MAC address of the locator device,
wherein at least one of:
the translating further comprises:
receiving a set of at least two MAC addresses assigned to the locator device; and
translating the set of at least two MAC addresses to the physical location according to the MAC address encoding; or
the physical location of the network device comprises at least two of:
a building;
a floor in the building;
a server room on the floor;
a server row in the server room; or
a server rack in the server row.

15. The method of claim 14, wherein querying the network device further comprises:
querying the network to identify the network device;
requesting, from the network device, MAC addresses of additional network devices that are connected to the network device; and
receiving, from the network device and responsive to the request, the selected MAC address assigned to the locator device that encodes the physical location of the network device.

16. The method of claim 15, wherein:
the network device further comprises a network switch; and
querying the network to identify the network device further comprises:
querying the network to identify a collection of network switches that includes the network device.

17. The method of claim 14, wherein querying the network device further comprises:
receiving, from the network device, a set of MAC addresses that are respectively assigned to a connected network device that is connected to the network device; and
identifying, among the set of MAC addresses, the selected MAC address of the locator device having a custom MAC address portion indicating that the selected MAC address encodes the physical location of the network device according to the MAC address encoding.

18. The method of claim 14, wherein:
the MAC address encoding further maps respective physical locations to a set of two or more MAC addresses; and
the translating further comprises:
receiving the set of at least two MAC addresses assigned to the locator device; and
translating the set of at least two MAC addresses to the physical location according to the MAC address encoding.

19. The method of claim 14, wherein:
the selected MAC address further encodes an instance of a physical property of the locator device; and
the method further comprises: extracting the instance of the physical property encoded in the selected MAC address of the locator device.

20. The method of claim 14, further comprising:
updating a network catalog of network devices to indicate the physical location of the network device.

* * * * *